(12) United States Patent
Robinson et al.

(10) Patent No.: US 9,582,226 B2
(45) Date of Patent: Feb. 28, 2017

(54) SYSTEM AND METHOD FOR PRODUCING CLEAR COLORANT ON IMPOSED MULTI-PASS PAGES

(71) Applicant: Xerox Corporation, Norwalk, CT (US)

(72) Inventors: David C. Robinson, Penfield, NY (US); Mark A. Smith, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/801,449

(22) Filed: Jul. 16, 2015

(65) Prior Publication Data
US 2017/0017440 A1 Jan. 19, 2017

(51) Int. Cl.
*G06F 3/12* (2006.01)

(52) U.S. Cl.
CPC .......... *G06F 3/1205* (2013.01); *G06F 3/1215* (2013.01); *G06F 3/1219* (2013.01); *G06F 3/1256* (2013.01)

(58) Field of Classification Search
None
See application file for complete search history.

(56) References Cited

U.S. PATENT DOCUMENTS

| | | | |
|---|---|---|---|
| 5,790,150 A | 8/1998 | Lidke et al. | |
| 6,348,969 B1 | 2/2002 | Ikeda | |
| 6,954,276 B2 | 10/2005 | Lapstun et al. | |
| 7,391,537 B2 | 6/2008 | Eschbach et al. | |
| 7,654,657 B2 | 2/2010 | Seshimo | |
| 8,079,694 B2 | 12/2011 | Steed et al. | |
| 8,213,035 B2 | 7/2012 | Fukuda | |
| 8,287,081 B2 * | 10/2012 | Larson | B41J 2/175 347/14 |
| 8,447,204 B2 | 5/2013 | Qiao et al. | |
| 8,477,376 B2 | 7/2013 | Robinson et al. | |
| 8,491,960 B2 | 7/2013 | Kiy | |
| 8,514,416 B2 * | 8/2013 | Anai | G06F 3/1206 358/1.13 |
| 8,675,248 B2 | 3/2014 | Matsushita et al. | |
| 8,736,902 B2 | 5/2014 | Robinson et al. | |
| 8,964,234 B1 * | 2/2015 | Robinson | G06F 3/1288 358/1.15 |
| 9,262,705 B2 * | 2/2016 | Nakatani | G06K 15/1878 |
| 2006/0114481 A1 | 6/2006 | Moore | |
| 2011/0043840 A1 | 2/2011 | Iinuma | |
| 2011/0210998 A1 | 9/2011 | Kaneko et al. | |
| 2012/0189776 A1 | 7/2012 | Robinson et al. | |
| 2013/0016389 A1 | 1/2013 | Robinson | |

* cited by examiner

*Primary Examiner* — Paul F Payer
(74) *Attorney, Agent, or Firm* — Gibb & Riley, LLC (57) ABSTRACT

According to exemplary methods herein, a print job comprising an electronic document and job attributes including an imposition template is received into a marking device having a print engine using a standard color gamut and another colorant. A sheet of the job is analyzed for the standard color gamut and for the other colorant. The layout of images for multiple pages of the electronic document on the sheet is determined and the number of passes of the sheet through the print engine is determined based on image requirements for each page on the sheet. User selectable instructions modify the printing instructions for selected pages on the sheet. The user selectable instructions include parameters associated with the number of passes of the sheet through the print engine and the use of the standard color gamut and the other colorant in the images for printing each of the pages on a substrate.

19 Claims, 6 Drawing Sheets

SYSTEM AND METHOD FOR PRODUCING CLEAR COLORANT ON IMPOSED MULTI-PASS PAGES

BACKGROUND

Systems and methods herein generally relate to printing systems, and more particularly to printing of clear and pigmented colorants on a media substrate in multi-pass operation of a printing apparatus.

In modern desktop printing systems, a document can be created or received in electronic form on a device such as a personal computer, a personal digital assistant, or other suitable device. Parameters of print jobs (such as for finishing, imposition, color management) can be set at the print queue, print job, page description language (PDL) creation, exception page creation, line printer remote (LPR), and job ticket level. Imposition settings are job settings that cause page images to be placed on print media at specific locations, orientations, and scalings. For example, a user can format the document, adjust the layout of the document, change fonts, change font sizes, etc. These settings are reconciled before a job is submitted for print. Thereafter, the document can be printed on a printer to produce a hardcopy of the document. The hardcopy of the document can further be bound or otherwise subjected to processing to result in a finished product.

Imposition is one of the fundamental steps in the prepress printing process. It consists in the arrangement of the printed product's pages on the printer's sheet, in order to print faster, simplify binding, and reduce paper waste. In particular, it allows the printer to set up such documents as business cards, magazines, flyers, postcards, and brochures. Print operators will print books using large sheets of paper that will be folded and trimmed later. This allows for faster printing, simplified binding, and lower production costs. Imposition is the process of arranging the pages correctly prior to printing so that they fold in the correct order. To someone unfamiliar with the imposition process, the pages may seem to be arranged randomly; but after printing, the paper is folded, bound, and trimmed. If correctly imposed, the pages all appear in the correct orientation and readable sequence.

Various printing systems support the loading of spot colorants in an extension print housing. The initial print housing generally supports the base colorants (e.g., C, M, Y, K (Cyan, Magenta, Yellow, and Black)). Many printing devices can produce printed output with the spot colorant in addition to CMYK. An additional colorant may include white or clear colorant.

A use of clear colorant on printed media sheets is becoming more diverse with newly discovered applications for using the clear colorant as a way to achieve particular visible effects. Typically, the printing device can support several options for the printing of clear and the CMYK colorants for multi-pass operations. For example, clear can be printed:

1. As the first pass(es) with a final pass adding the CMYK colorant. (aka Base clear)
2. As the 2nd (and later passes) with the CMYK colorants printed first
   a. Over the entire page (aka flood clear)
   b. Selectively on top of specified Objects (aka Object clear)
   c. Via Page Description language constructs (aka Embedded clear)
   d. Where no CMYK content appears (aka Infill clear)

Additionally, the number of passes to be printed may be specified in combination with any of the above options. Each pass may be used to render one coat of the clear colorant layer.

The current procedure for handling multiple pass clear is to RIP the page once. The CMYK and clear are applied on the first pass. Then, clear colorant only is applied on subsequent passes. However, an imposed printed sheet may have print ordering schemes for both CMYK and clear applied to the pages of a single sheet; and it may have varying numbers of passes specified for the pages. Current image processing capabilities do not support separate commands for each page of multiple pages on a single sheet of media. That is, a single set of image planes (e.g., cyan, magenta, yellow, black, or clear only) for the entire sheet is sent to the marking engine for a particular print pass. Hence, if one portion of the sheet requires clear on top of CMYK and another portion requires clear under CMYK this could not be accomplished.

SUMMARY

A printing apparatus is disclosed. The printing apparatus includes a marking engine and a controller operatively connected to the marking engine. The controller is configured to execute computer readable instructions that when executed, perform a method of printing on a media substrate associated with the marking engine. A page exception selection is provided in a user interface in order to enable the designation of a job having different multi-pass printing options and pass counts for the pages that make up a side of a sheet of printing media.

According to exemplary methods herein, a print job is received into a computerized device comprising a marking device. The print job comprises an electronic document and print job attributes including an imposition template defining an arrangement of images in the electronic document. The marking device comprises a print engine using a standard color gamut and another colorant. A sheet of the print job is analyzed by the computerized device for the standard color gamut and for the other colorant. The sheet comprises multiple pages of the electronic document based on the imposition template. According to the analysis, the layout of images for the multiple pages of the electronic document is determined and the number of passes of the sheet through the print engine is determined for the print job based on image requirements for each page of the multiple pages on the sheet according to the print job attributes. User selectable instructions are received from a user interface connected to the computerized device. The user selectable instructions modify the printing instructions for user selected pages of the multiple pages on the sheet. The user selectable instructions include parameters associated with the number of passes of the sheet through the print engine and the use of the standard color gamut and the another colorant in the images for printing each page of the multiple pages on a media substrate.

According to exemplary methods herein, an electronic document having a print job ticket is received into a computerized device. The print job ticket comprises job ticket parameters and an imposition template defining layout parameters. The job ticket parameters include a print job description comprising commands for using a standard color gamut and another colorant. Image processing is performed on the print job description to generate a ready-to-print file. According to the image processing, the layout of images for the multiple pages of the electronic document is determined and the number of passes of the sheet through the print engine is determined for the print job based on image requirements for each page of the multiple pages on the sheet according to the print job attributes. User selectable instructions are received from a user interface connected to the computerized device to modify printing instructions for user selected pages of the multiple pages on the sheet. The user selectable instructions include parameters associated with the number of passes of the sheet through the print engine and the print job description for at least one of the standard color gamut and the another colorant for printing each page of the multiple pages on a media substrate. A modified ready-to-print file is generated using modified printing instructions for user selected pages of the multiple pages on the sheet. The modified ready-to-print file is saved in a modified ready-to-print format. The images are rendered on the media substrate according to the modified ready-to-print format.

According to printing systems herein, a processor processes a print job. The print job comprises an electronic document having an original print job ticket comprising job ticket parameters and an imposition template defining layout parameters. The processor comprises an image processor component. The job ticket parameters include a print job description comprising commands for using a standard color gamut and another colorant. A user interface is connected to the processor. A marking device comprising a print engine is connected to the processor. The marking device receives the print job. The print engine comprises pigmented colorant applying components rendering color layers on a media sheet and at least one additional colorant applying component rendering one or more additional layers on the media substrate. The image processor component determines the layout of images on a sheet comprising multiple pages of the electronic document based on the imposition template and determines the number of passes of the sheet through the print engine for the print job based on image requirements for each page of the multiple pages on the sheet according to the print job attributes. The user interface receives user selectable instructions modifying the printing instructions for user selected pages on the sheet. The user selectable instructions include parameters associated with the number of passes of the sheet through the print engine and the print job description for least one of the standard color gamut and the another colorant for printing each page of the multiple pages on a media substrate. The processor generates a modified ready-to-print file using the modified printing instructions for selected pages of the multiple pages on the sheet. The marking device renders the images on the media substrate according to the modified ready-to-print file.

According to a computer system for optimally producing clear colorant on imposed multi-pass pages, the computer system comprises a program product comprising a tangible computer readable storage medium having program code embodied therewith. The program code is readable and executable by a computer to provide an application to perform a method. According to the method, a print job is received into a computerized device comprising a marking device. The print job comprises an electronic document and print job attributes including an imposition template defining an arrangement of images in the electronic document. The marking device comprises a print engine using a standard color gamut and a clear colorant. A sheet of the print job is analyzed by the computerized device for the standard color gamut and for the clear colorant. The sheet comprises multiple pages of the electronic document based on the imposition template. According to the analysis, the layout of images for the multiple pages of the electronic document is determined and the number of passes of the sheet through the print engine is determined for the print job based on image requirements for each page of the multiple pages on the sheet according to the print job attributes. User selectable instructions are received from a user interface connected to the computerized device. The user selectable instructions modify the printing instructions for user selected pages of the multiple pages on the sheet. The user selectable instructions include parameters associated with the number of passes of the sheet through the print engine and use of the clear colorant in the images for printing each page of the multiple pages on a media substrate.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

With the advent of "clear" colorant and machines capable of printing clear colorants in addition to black and colors, new options are available to users of printing systems. The color gamut of a printer is a multi-dimensional space of a given volume with the axes of the space being set or defined initially by the pigments used in the colorants of the primary colors. Each set of color primaries: red, green, blue (RGB) or cyan, magenta, yellow, and black (CMYK), defines a "color space" that includes all colors that can result from any combination of these primaries. The "color space," or "color gamut," may be quite different for different sets of primaries. Typically, a CMYK color gamut falls inside (is smaller than) a RGB color gamut, which means that the eye can detect more colors than a printer can print. In forming multi-color output images on an image-receiving medium, each of the primary colors is transferred to the image-receiving medium in turn. The color gamut is defined by the interaction of the primary colors, and is limited by a total amount of colorant in any combination that can be effectively deposited on the image-receiving medium. In other words, it is not possible to print some colors that can be photographed or displayed on a monitor when using CMYK printing. The color gamut for a particular image forming device and an associated color rendition dictionary (CRD) by which images may be produced by the image forming device is usually stored in metadata with the image forming device. The CRD and associated set of set points programmed into the image forming device, or family of image forming devices, ensures that the color gamut produced by that image forming device covers, as broadly as possible, an available standard color spectrum.

An incoming print job includes a PDL file that describes the appearance of a printed page according to the job. The input may be a page description using a page description language (PDL). A page description language (PDL) is a computer language that describes for the print engine the appearance of a printed page in a higher level than an actual output bitmap. The PDL file specifies the arrangement of the printed page through commands for the print engine. Clear colorant allows the ability to create a unique IQ (Image Quality) effect when added to a color printed page. A clear colorant system enables the association of clear texturing with object types/pages. A default set of textures can be made available for operator selection. Furthermore, operators can also import or create textures. The textures are applied by building, for example, via a decomposer, a clear image plane from the texture. The texture is applied on the proper portion of the incoming PDL pages via mask and merge functionality in the decomposer.

In particular, and according to aspects of this disclosure, the print engine can produce printed output with the Spot Colorant on top of CMYK or the CMYK on top of the Spot Colorant. By printing a clear colorant pattern over the top of a color image a unique texture or 3D effect can be added. According to one aspect disclosed herein, a FreeFlow Print Server (FFPS) DFE supports several options for the printing of clear and CMYK colorants for multi-pass mode. A Spot Colorant, such as "clear" can be printed over an entire page, selectively over specified objects, embedded in the image, where no other image content appears, etc. According to one example of this disclosure, a system is provided in which a machine operator selects a texture or set of textures that are applied to select regions or objects on a page. A variety of attributes may be programmed by the operator using a clear pattern GUI (Graphical User Interface). Once the setup is complete, a full-page clear color plane image is created and submitted along with the print job to an image processor. The image processor in turn decomposes the color image along with the clear image and creates a multi-plane bitmap. The number of planes being equal to the number of primary colors in the selected gamut (three for RGB or four for CMYK) plus one for the clear plane.

As used herein, an image forming device can include any device for rendering an image on print media, such as a copier, laser printer, bookmaking machine, facsimile machine, or a multifunction machine (which includes one or more functions such as scanning, printing, archiving, emailing, and faxing). "Print media" can be a physical sheet of paper, plastic, or other suitable physical print media substrate for carrying images. A "print job" or "document" is referred to for one or multiple sheets copied from an original print job sheet(s) or an electronic document page image, from a particular user, or otherwise related. An original image is used herein to mean an electronic (e.g., digital) or physical (e.g., paper) recording of information. In its electronic form, the original image may include image data in a form of text, graphics, or bitmaps.

Figure 1:
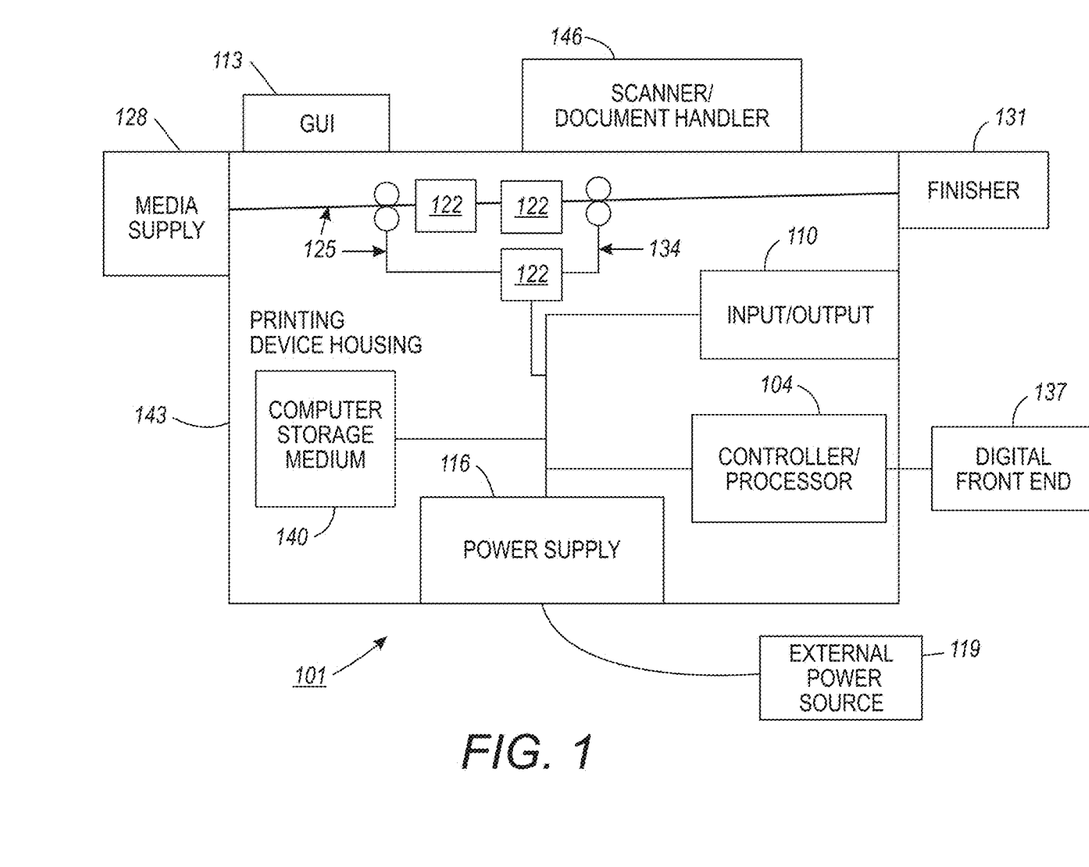
FIG. 1 is a side-view schematic diagram of an exemplary multi-function device according to systems and methods herein.
Figure 5:
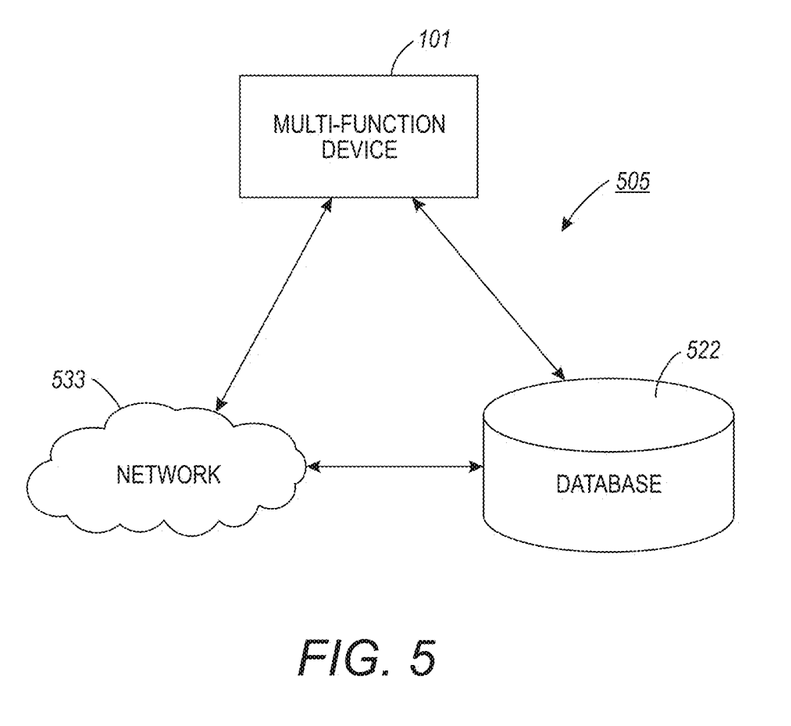
FIG. 5 is a block diagram of a network according to systems and methods herein.

Referring now to the drawings, and more specifically to FIG. 1, what is illustrated is an exemplary multi-function device (MFD) 101 that can be used with methods herein. The MFD 101 includes a controller/processor 104 and an Input/Output device 110 operatively connected to the controller/processor 104. The MFD 101 may be connected to a computerized network 505 external to the multi-function device 101 through a communications port of the Input/Output device 110, such as shown in FIG. 5, described below. In addition, the MFD 101 can include at least one accessory functional component, such as a user interface (GUI) 113. The GUI 113 acts as common interface for print job submission and operates on power supplied from a power supply 116. An external power source 119 may provide electrical power to the MFD 101 through the power supply 116. The Input/Output device 110 is used for communications to and from the MFD 101. The controller/processor 104 controls the various actions of the MFD 101.

The MFD 101 may include at least one marking device (sometimes referred to as a print engine 122) operatively connected to the controller/processor 104. A media path 125 is positioned to supply sheets of media from a media supply 128 to the print engine(s) 122, etc., along the media path 125. The media supply 128 supports internal box-fed, pin-fed, fan-fold media types. After receiving various markings from the print engine(s), the sheets of media can optionally pass to a finisher 131 which can fold, staple, sort, etc., the various printed sheets.

Thus, the multi-function device 101 herein has a media supply 128 supplying media to the media path 125. The media path 125 can comprise any combination of belts, rollers, nips, drive wheels, vacuum devices, air devices, etc. The print engines 122 are positioned along the media path 125. That is, the multi-function device 101 comprises a document-processing device having the print engine 122. The print engine 122 prints marks on the media. After receiving various markings from the print engine(s) 122, the sheets of media can optionally pass to a finisher 131 which can fold, staple, sort, etc., the various printed sheets. As described herein, a return paper path 134 may deliver the printed sheets to the same or different print engine 122 for at least a second layer of colorant to be applied. Each return of the media to the print engine 122 is referred to herein as a "pass".

A marking device is any device capable of rendering the image. The set of marking devices includes, but is not limited to, digital document reproduction equipment and other copier systems, as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network.

A Digital Front End (DFE) 137 is connected to the controller/processor 104 of the MFD 101. The DFE 137 prepares and processes a job for the print engine and includes one or more image processors (such as raster image processors (RIPs)) that render from a page description language (PDL) such as PostScript, PDF or XPS to a raster: a pixel-based representation of the page suitable for delivery to the print heads of the print engine 122. A raster image processor uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes. The DFE 137 is able to load files from various sources on a network, such as shown in FIG. 5, and process them in order to be printed on digital equipment, whether it be a small desktop printer or a large digital press. The controller/processor 104 takes the imposed print ready input from DFE 137 and controls the print engine 122 for printing.

According to systems and methods herein, the DFE 137 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the multi-function device 101 is special purpose machine that includes a specialized image processing card having unique ASICs for providing image processing instructions, includes specialized boards having unique ASICs for input and output devices to speed network communications processing, a specialized ASIC processor that performs the logic of the methods described herein using dedicated unique hardware logic circuits, etc. It is contemplated that the DFE 137 may comprise a raster image processor (RIP). A raster image processor uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

The multi-function device 101 may also include a non-transitory computer storage medium 140 (which can be optical, magnetic, capacitor based, etc.) that is readable by the controller/processor 104 and stores instructions that the controller/processor 104 executes to allow the multi-function device 101 to perform its various functions, such as those described herein.

Thus, as shown in FIG. 1, a body housing 143 has one or more functional components that operate on power supplied from an external power source 119, which may comprise an alternating current (AC) power source, through the power supply 116. The power supply 116 can comprise a power storage element (e.g., a battery) and connects to the external power source 119. The power supply 116 converts the power from the external power source 119 into the type of power needed by the various components of the MFD 101.

The print engine(s) 122 may include a color applying component (i.e., a source of pigmented colorant) that supplies at least pigmented colorant for applying color to the media passing through the print engine 122. Additionally, the print engine(s) 122 may include a clear colorant applying component that supplies clear colorant for applying to the media passing through the print engine 122.

In addition to the user interface 113, the multi-function device 101 can include other accessory functional components (such as a scanner/document handler 146, automatic document feeder (ADF), etc.) that operate on the power supplied from the external power source 119 (through the power supply 116).

As would be understood by those ordinarily skilled in the art, the multi-function device 101 shown in FIG. 1 is only one example and the systems and methods herein are equally applicable to other types of devices that may include fewer components or more components. For example, while a limited number of print engines and media paths are illustrated in FIG. 1, those ordinarily skilled in the art would understand that many more paper paths and additional print engines could be included within any device used with embodiments herein.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device. An image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network.

To print an image, a print engine processor, sometimes referred to herein as an image processor, converts the image in a page description language or vector graphics format to a bit mapped image indicating a value to print at each pixel of the image. Each pixel may represent a dot, also called a picture element or pixel. The sequence of dots forming a character is called a raster pattern. The number of dots per inch that a printer generates is called the print resolution, or density. A resolution of 240 pixels means that a printer prints 240 pixels per inch both vertically and horizontally, or 57,600 pixels per square inch (240×240).

The DFE 137 produces the contone, which is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

Each bit representing a pixel that is "on" is converted to an electronic pulse. The electronic pulses generated from the raster pixel data at which to deposit colorant turns the laser beam on to positively charge the surface of a rotating drum, which is an organic photo-conducting cartridge (OPC), that has a coating capable of holding an electrostatic charge. The laser beam turns on and off to beam charges at pixel areas on a scan line across the drum that will ultimately represent the output image. After the laser beam charges all pixels on the scan line indicated in the raster data, the drum rotates so the laser beam can place charges on the next scan line. The drum with the electrostatic positive charges then passes over negatively charged colorant. The negatively charged colorant is then attracted to the positive charged areas of the drum that form the image. The paper, which is negatively charged, passes over the roller drum and attracts the colorant as the areas of the roller drum with the colorant are positively charged to transfer the colorant forming the image from the roller drum to the paper.

When an image surface is to be composed of multiple pages that use different clear vs. CMYK colorant print pass ordering, the full set of image plane data (to cover all print passes) is produced by the RIP. However, different multi-pass clear printing options and pass counts may be indicated for some or all of the pages that make up a side of a sheet of printing media. The options may call for different ordering of printing of a clear layer vs. the CMYK colorants, which compose the page's "image".

Figure 2:
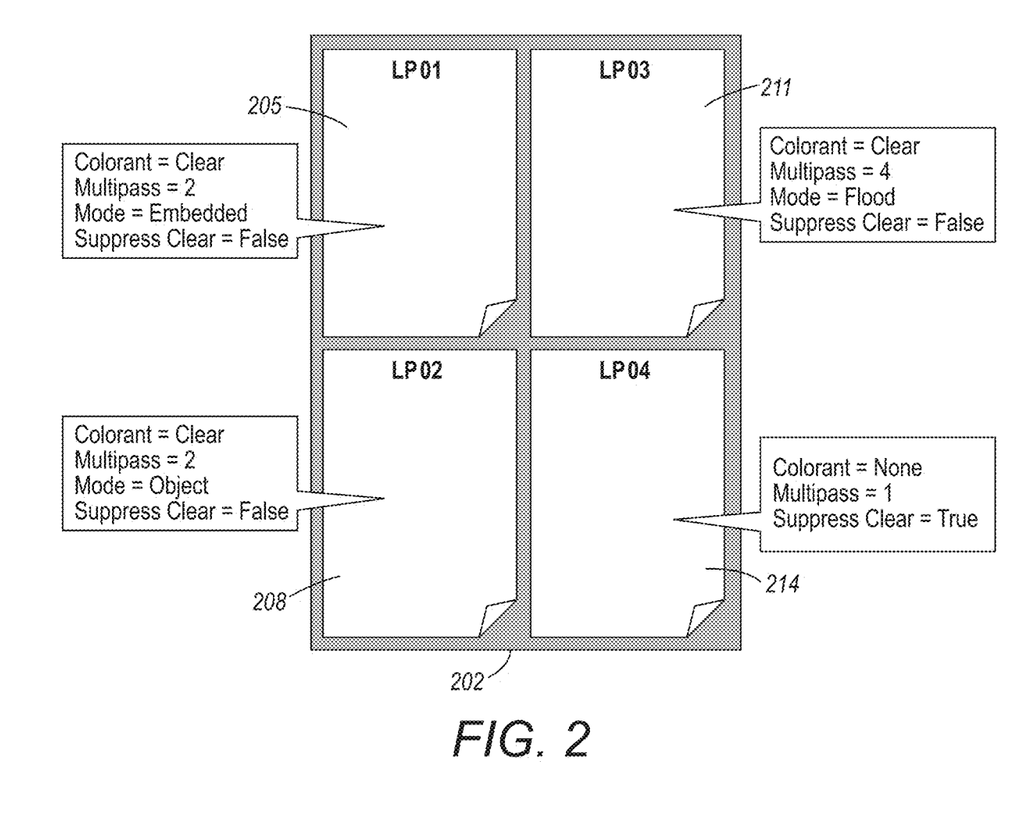
FIG. 2 is an illustration of an exemplary imposed sheet having multiple pages with different printing requirements according to systems and methods herein.

FIG. 2 shows an exemplary sheet 202 having multiple pages imposed thereon. As shown in FIG. 2, each page of the multiple pages may have different printing requirements. In this example, the first logical page 205 requires two passes of clear colorant embedded in the rendered image. ('Embedded' means the signal for clear colorant is incorporated in the page description language with CMYK use.) The second logical page 208 requires two passes. In a first pass, the page image is rendered in CMYK; in a second pass, clear colorant is selectively applied on top of specified objects. The third logical page 211 requires four passes. In a first pass, the page image is rendered in CMYK; in three subsequent passes, clear colorant is flood over the entire page. The fourth logical page 214 uses no clear colorant on the page. The page image is rendered in CMYK in a single pass.

In other words, in the example shown in FIG. 2, the sheet 202 would pass through the print engine 122 four times. In the first pass, CMYK is used to render an image on each of the logical pages 205-214. In the second pass, clear colorant is applied to portions of the first logical page 205 and the second logical page 208. Also, in the second pass, clear colorant is flood over the entirety of the third logical page 211. Meanwhile, in the second pass, nothing is applied to the fourth logical page 214. In each of the third and fourth passes, clear colorant is flood over the entirety of the third logical page 211. Meanwhile, in each of the third and fourth passes, nothing is applied to the first logical page 205, the second logical page 208, and the fourth logical page 214.

Since the full set of image plane data (to cover all print passes) is produced by the RIP, a page exception selection is added to the GUI 113 in order to enable the designation of a job having different multi-pass clear printing options and pass counts for selected pages that make up a side of a sheet of printing media. The printing options may call for different ordering of printing of a clear layer vs. the CMYK colorants, which compose the page's "image". A portion of the Job Description File (JDF) that is supplied to the RIP is supplied to the DFE 137. The JDF supplied to the DFE 137 describes the location and the print plane layers that are to be printed for each pass. Portions of layers that are to be suppressed for a print pass are set to 0. Pixel values for regions of an image plane(s) that are to be suppressed for a print pass are set to 0 (non-printing) value. The DFE 137 creates a bitmap that is used by the print engine 122 to control image plane content to be printed. The bitmap consists of 2 bits per pixel. The states may include:

0=print just CMYK planes
1=print just clear plane
2=print CMYK and clear planes.

According to systems and methods herein, a multi-pass imposed print job with different image plane requirements across a sheet side is RIPed once. The JDF imaging and imposition information is used to drive pass-appropriate commands for the print engine. While the disclosed examples discuss application of clear colorant, the concepts could be extended to accommodate other colorants such as "White" (e.g. White base coating, White infill, etc.). Additionally, the concepts could be extended to use more colors and color extensions. For example a CMYK+Orange+clear print system. Furthermore, the tag map driving the image processor image plane content manipulation can be accomplished in different modules.

Figure 3:
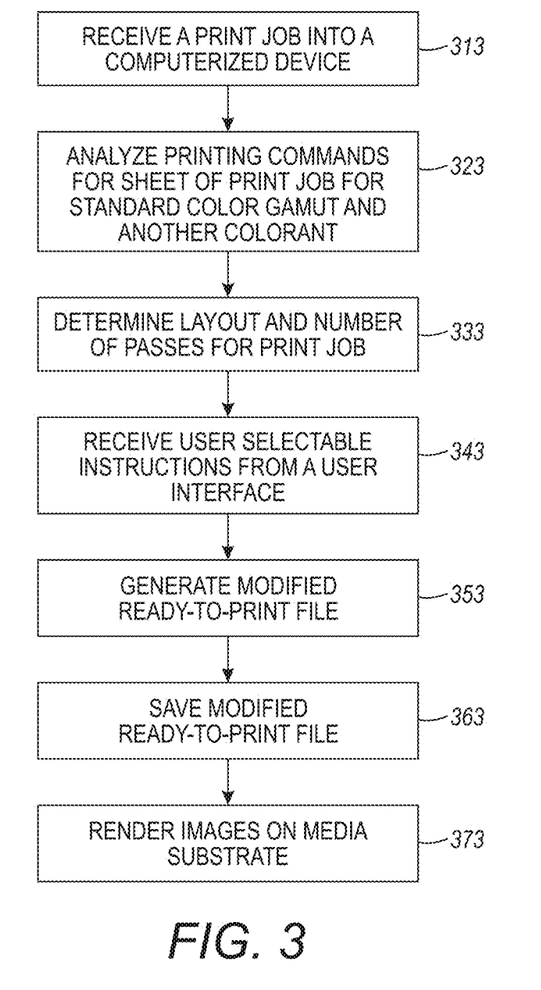
FIG. 3 is a flow diagram illustrating exemplary methods herein.

FIG. 3 is a flow diagram illustrating the processing flow of an exemplary method according to the present disclosure. The method is useful for optimal colorant limiting on multi-pass clear jobs. At 313, a print job is received into a computerized device comprising a marking device. The print job comprises an electronic document and print job attributes including an imposition template defining an arrangement of images in the electronic document. The marking device comprises a print engine using a standard color gamut and another colorant. The computerized device analyzes the printing commands for a sheet of the print job for the standard color gamut and for the other colorant, at 323. The sheet comprises multiple pages of the electronic document based on the imposition template. According to the analysis, the layout of images for the multiple pages of the electronic document is determined and the number of passes of the sheet through the print engine is determined for the print job based on image requirements for each page of the multiple pages on the sheet according to the print job attributes, at 333. User selectable instructions are received from a user interface connected to the computerized device, at 343. The user selectable instructions modify the printing instructions for user selected pages of the multiple pages on the sheet. The user selectable instructions include parameters associated with the number of passes of the sheet through the print engine and the use of the standard color gamut and the another colorant in the images for printing each page of the multiple pages on a media substrate. At 353, a modified ready-to-print file is generated using modified printing instructions for user selected pages of the multiple pages on the sheet. At 363, the modified ready-to-print file is saved in a modified ready-to-print format. The images are rendered on a media substrate according to the modified ready-to-print format, at 373.

Figure 4A:
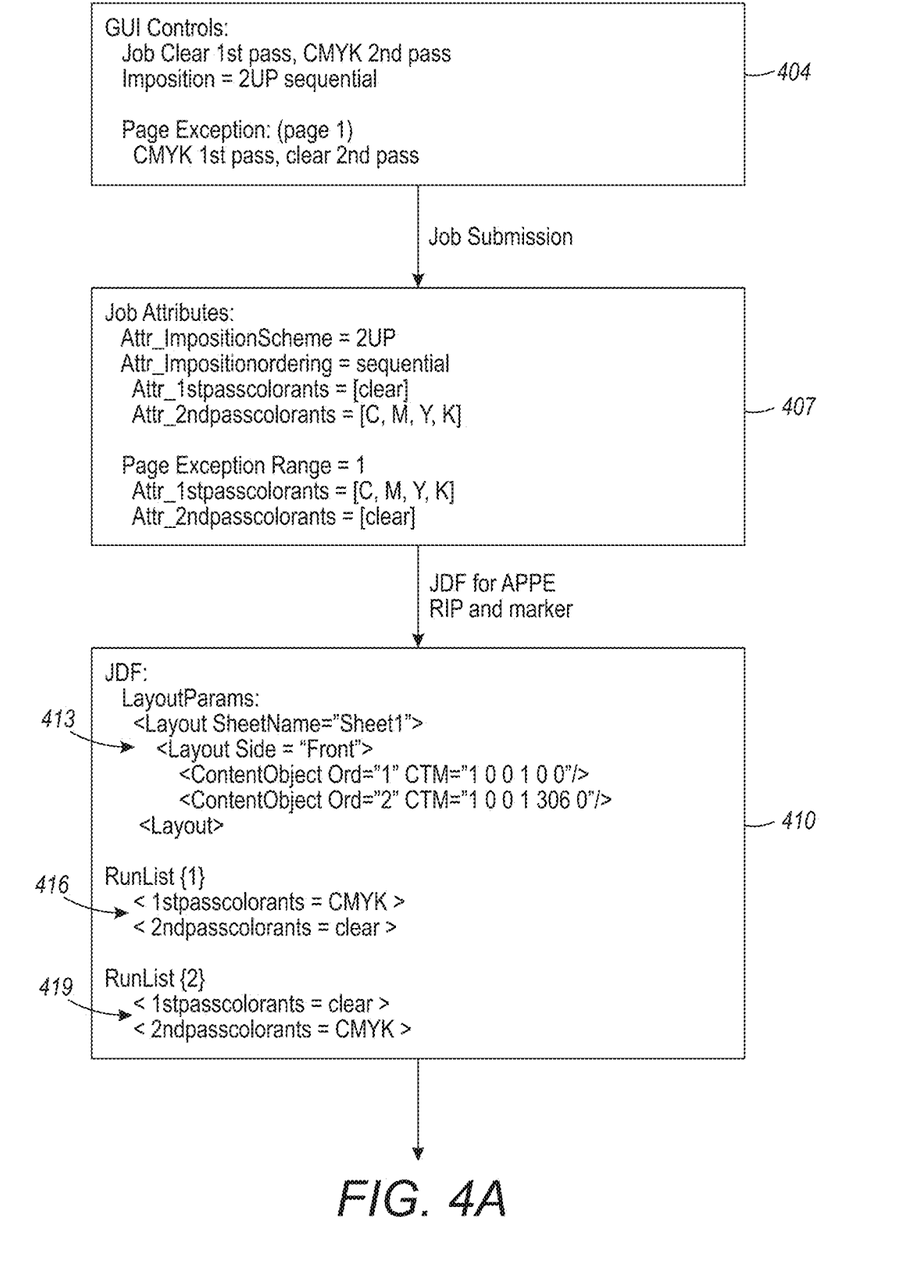
FIGS. 4A and 4B illustrate the assembly of a job description file for various passes of an image according to systems and methods herein.
Figure 4B:
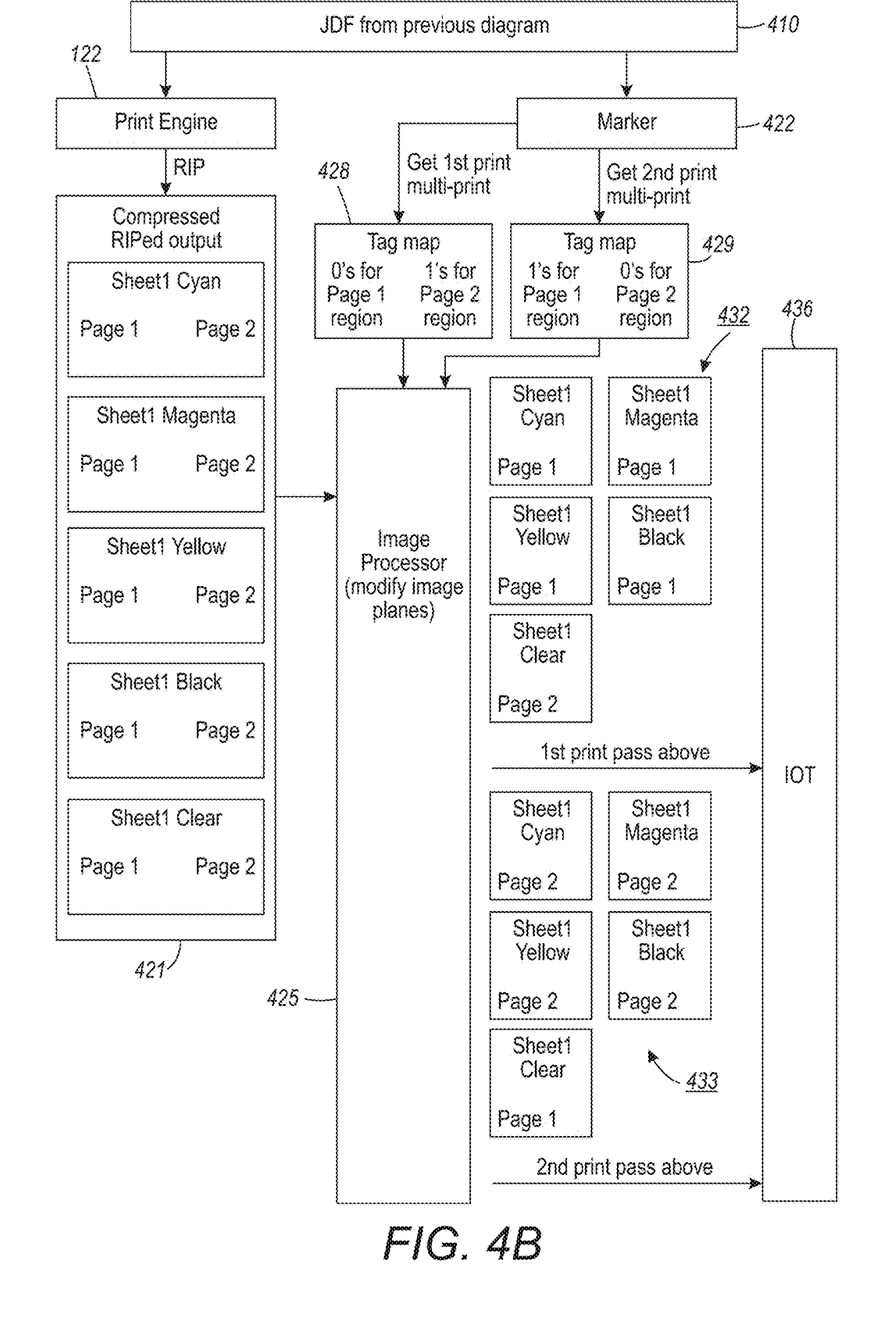

FIGS. 4A and 4B illustrate the assembly of a job description file (JDF) for various passes of an image according to systems and methods herein. In FIG. 4A, Block 404 represents the controls for the GUI 113. As illustrated, the initial job calls for two pages on a sheet with clear applied on the first pass and CMYK applied on the second pass. However, there is a Page Exception for the first page that calls for CMYK applied on the first pass and clear applied on the second pass. Block 407 represents the Job Attributes according to the job submission. As shown in Block 407, the page exception applies to only one page on the sheet. Block 410 represents the job description file (JDF) that is sent to the marking device. The layout parameters 413 show that there will be two pages on a single sheet. According to the page exception, the RunList for the first page 416 show that the first pass will be CMYK and the second pass will be clear. The RunList for the second page 419 show that the first pass will be clear and the second pass will be CMYK. As shown in FIG. 4B, a portion of the JDF is supplied to the Print Engine 122. As described above, the full set of image plane data (to cover all print passes) is produced by the RIP, as shown in block 421. The image plane data is supplied to the marker 422, which creates a bitmap that is used by the image processor 425 to control image plane content to be printed. The JDF supplied to the image processor 425 describes the location and the print plane layers that are to be printed for each pass. Portions of layers that are to be suppressed for a print pass are set to 0 (non-printing) values. Block 428 shows the tag map for the first pass on the sheet. In the first pass, the tag map indicates 0's for the first page, which means print just the CMYK planes; and 1's for the second page, which means print just a clear plane. Block 429 shows the tag map for the second pass on the sheet. In the second pass, the tag map indicates 1's for the first page, which means print just a clear plane; and 0's for the second page, which means print just the CMYK planes. Each of the color planes for the first pass is indicated at 432, and each of the color planes for the second pass is indicated at 433. The color planes for the first pass 432 and for the second pass 433 are sent to the image output terminal (IOT) 436 to produce the images for both pages on a single sheet.

That is, as described above, a printing system comprises a multi-function device 101 having a controller/processor 104 that processes a print job according to an original print job description. The controller/processor 104 comprises an image processor component. The print job comprises an electronic document having an original print job ticket comprising job ticket parameters and an imposition template defining layout parameters. The job ticket parameters include a print job description comprising commands for using a standard color gamut and another colorant. At least one print engine 122 is connected to the image processor portion of the controller/processor 104. The print engine 122 comprises pigmented colorant applying components rendering color layers on a media sheet and at least one additional colorant applying component rendering one or more additional layers on the media substrate. A user interface 113 is connected to the processor. The image processor component determines the layout of images on a sheet comprising multiple pages of the electronic document based on the imposition template and determines the number of passes of the sheet through the print engine for the print job based on image requirements for each page of the multiple pages on the sheet according to the print job attributes. The user interface 113 receives user selectable instructions modifying the printing instructions for user selected pages on the sheet. The user selectable instructions include parameters associated with the number of passes of the sheet through the print engine and the print job description for least one of the standard color gamut and the other colorant for printing each page of the multiple pages on a media substrate. The controller/processor 104 processes instructions of the original print job description modifying the printing commands. The controller/processor 104 generates a modified ready-to-print file using the modified printing instructions for selected pages of the multiple pages on the sheet. The print engine 122 renders the images on the media substrate according to the modified ready-to-print format.

FIG. 5 is a general overview block diagram of a network, indicated generally as 505, for communication between the multi-function device 101 and a database 522. The multi-function device 101 may comprise any form of processor as described in detail above. The multi-function device 101 can be programmed with appropriate application software to implement the methods described herein. Alternatively, the multi-function device 101 is a special purpose machine that is specialized for processing image data and includes a dedicated processor that would not operate like a general purpose processor because the dedicated processor has application specific integrated circuits (ASICs) that are specialized for the handling of image processing operations, processing pixel data, information for multi-pass operation documents, etc. In one example, the multi-function device 101 is special purpose machine that includes a specialized card having unique ASICs for providing image processing instructions, includes specialized boards having unique ASICs for input and output devices to speed network communications processing, a specialized ASIC processor that performs the logic of the methods described herein (such as the processing shown in FIG. 3) using dedicated unique hardware logic circuits, etc.

Database 522 includes any database or any set of records or data that the multi-function device 101 desires to retrieve. Database 522 may be any organized collection of data operating with any type of database management system. The database 522 may contain matrices of datasets comprising multi-relational data elements.

The database 522 may communicate with the multi-function device 101 directly. Alternatively, the database 522 may communicate with the multi-function device 101 over network 533. The network 533 comprises a communication network either internal or external, for affecting communication between the multi-function device 101 and the database 522. For example, network 533 may comprise a local area network (LAN) or a global computer network, such as the Internet.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the processes/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the method illustrated in FIG. 3. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 3.

The computer program instructions may be stored in a computer readable medium that can direct a computer, other programmable data processing apparatus, or other devices to process in a particular manner, such that the instructions stored in the computer readable medium produce an article of manufacture including instructions which implement the process/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the processes/acts specified in the flowchart and/or block diagram block or blocks.

Those skilled in the art would appreciate that the storage medium is not limited to a peripheral device having the program stored therein, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the computer storage medium may be a hard disk, or the like, which has the program stored therein and is distributed to the user together with the device that contains them.

The hardware described herein plays a significant part in permitting the foregoing method to be performed, rather than function solely as a mechanism for permitting a solution to be achieved more quickly, (i.e., through the utilization of a computer for performing calculations). Specifically, printers, scanners, and image processors that alter electronic documents each play a significant part in the methods (and the methods cannot be performed without these hardware elements). Therefore, these hardware components are fundamental to the methods being performed and are not merely for the purpose of allowing the same result to be achieved more quickly.

As would be understood by one ordinarily skilled in the art, the processes described herein cannot be performed by human alone (or one operating with a pen and a pad of paper) and instead such processes can only be performed by a machine. Specifically, processes such as printing, scanning, electronically altering documents using an image processor, etc., require the utilization of different specialized machines. Therefore, for example, the printing/scanning performed by the user device cannot be performed manually (because it can only be done by printing and scanning machines) and is integral with the processes performed by methods herein. In other words, these various machines are integral with the methods herein because the methods cannot be performed without the machines (and cannot be performed by humans alone).

Additionally, the methods herein solve many highly complex technological problems. For example, as mentioned above, in conventional systems, all the color planes for an entire sheet are sent to the TOT for a particular print pass. This does not allow for individual treatment for each page when multiple pages are rendered on a single sheet. Methods herein solve this technological problem by providing a page exception to treat each of multiple pages individually.

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a 'circuit', 'module, or 'system.' Furthermore, aspects of the present disclosure may take the form of a computer program product embodied in one or more computer readable medium(s) having computer readable program code embodied thereon.

The flowchart and block diagrams in the figures illustrate the architecture, functionality, and operation of possible implementations of systems, methods, and computer program products according to various devices and methods herein. In this regard, each block in the flowchart or block diagrams may represent a module, segment, or portion of code, which comprises one or more executable instructions for implementing the specified logical process(s). It should also be noted that, in some alternative implementations, the processes noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified processes or acts, or combinations of special purpose hardware and computer instructions.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, it is not intended for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), Input/Output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include Input/Output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The corresponding structures, materials, acts, and equivalents of all means or step plus process elements in the claims below are intended to include any structure, material, or act for performing the process in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

The terms printer or printing device as used herein encompasses any apparatus, such as a digital copier, bookmaking machine, facsimile machine, multi-function machine, etc., which performs a print outputting function for any purpose. The details of printers, print engines, etc., are well known, and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The terminology used herein is for the purpose of describing particular examples of the disclosed structures and methods and is not intended to be limiting of this disclosure. For example, as used herein, the singular forms 'a', 'an', and 'the' are intended to include the plural forms as well, unless the context clearly indicates otherwise. Additionally, as used herein, the terms 'comprises', 'comprising', and/or 'including', when used in this specification, specify the presence of stated features, integers, steps, operations, elements, and/or components, but do not preclude the presence or addition of one or more other features, integers, steps, operations, elements, components, and/or groups thereof. Further, the terms 'automated' or 'automatically' mean that once a process is started (by a machine or a user), one or more machines perform the process without further input from any user.

In addition, terms such as 'right', 'left', 'vertical', 'horizontal', 'top', 'bottom', 'upper', 'lower', 'under', 'below', 'underlying', 'over', 'overlying', 'parallel', 'perpendicular', etc., used herein are understood to be relative locations as they are oriented and illustrated in the drawings (unless otherwise indicated). Terms such as 'touching', 'on', 'in direct contact', 'abutting', 'directly adjacent to', etc., mean that at least one element physically contacts another element (without other elements separating the described elements).

It will be appreciated that the above-disclosed and other features and processes, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method comprising:
   receiving a print job into a computerized device comprising a marking device, said print job comprising an electronic document and print job attributes including an imposition template defining an arrangement of images in said electronic document, said marking device comprising a print engine using a standard color gamut and another colorant; and
   analyzing, by said computerized device, a sheet of said print job for said standard color gamut and for said another colorant, said sheet comprising multiple pages of said electronic document based on said imposition template, each page of said sheet having individual image requirements that call for different orderings of said standard color gamut and said another colorant, said analyzing comprising:
      determining the layout of images for said multiple pages of said electronic document,
      determining the number of passes of said sheet through said print engine for said print job based on said individual image requirements for each page of said multiple pages on said sheet according to said print job attributes, and
      generating a ready-to-print file according to said layout of images and said individual image requirements.

2. The method according to claim 1, said computerized device comprising a raster image processor.

3. The method according to claim 1, said standard color gamut comprising CMYK.

4. The method according to claim 1, said another colorant comprising clear or white.

5. The method according to claim 1, further comprising:
   rendering said images on a media substrate according to said ready-to-print file.

6. A method, comprising:
   receiving, into a computerized device, an electronic document having a print job ticket comprising job ticket parameters and an imposition template defining layout parameters, said job ticket parameters including a print job description comprising commands for using a standard color gamut and another colorant; and
   performing image processing on said print job description, said image processing generating a ready-to-print file, said image processing comprising:
      determining the layout of images on a sheet comprising multiple pages of said electronic document based on said imposition template, and
      determining the number of passes of said sheet through a print engine for said print job based on image requirements for each page of said multiple pages on said sheet according to said print job description, each page of said multiple pages on said sheet having individual image requirements that call for different orderings of said standard color gamut and said another colorant.

7. The method according to claim 6, said performing image processing comprising raster image processing on an image in said print job description.

8. The method according to claim 6, said standard color gamut comprising CMYK.

9. The method according to claim 6, said another colorant comprising clear or white.

10. The method according to claim 6, further comprising:
rendering said images on a media substrate according to said ready-to-print file, said rendering said images further comprising:
sending said ready-to-print file to a print engine;
rendering a first layer on said media substrate according to said print job description; and
returning said media substrate to said print engine for at least one additional layer according to said print job description, subsequent layers being rendered on a same side of said media substrate.

11. The method according to claim 6, further comprising:
receiving user selectable instructions from a user interface connected to said computerized device, said user selectable instructions modifying printing instructions for user selected pages of said multiple pages on said sheet, said user selectable instructions including parameters associated with said number of passes of said sheet through said print engine and said print job description for at least one of said standard color gamut and said another colorant for printing each page of said multiple pages on a media substrate;
generating a modified ready-to-print file using modified printing instructions for user selected pages of said multiple pages on said sheet;
saving said modified ready-to-print file in a modified ready-to-print format; and
rendering said images on said media substrate according to said modified ready-to-print format.

12. The method according to claim 11, said parameters associated with said number of passes of said sheet through said print engine further comprising:
an order for applying said standard color gamut and said another colorant on a same side of said media substrate.

13. A printing system, comprising:
a processor processing a print job, said print job comprising an electronic document having a print job ticket comprising job ticket parameters and an imposition template defining layout parameters for images in said electronic document, said processor comprising an image processor component, said job ticket parameters including a print job description comprising commands for using a standard color gamut and another colorant; and
a marking device comprising a print engine operatively connected to said processor, said marking device receiving said print job, said print engine comprising:
pigmented colorant applying components rendering color layers on a media substrate, and
at least one additional colorant applying component rendering one or more additional layers on said media substrate;
said image processor component:
determining the layout of images on a sheet comprising multiple pages of said electronic document based on said imposition template, each page of said sheet having individual image requirements that call for different orderings of said standard color gamut and said another colorant,
determining the number of passes of said sheet through said print engine for said print job based on said individual image requirements for each page of said multiple pages on said sheet according to said print job description and
generating a ready-to-print file according to said layout of images and said individual image requirements.

14. The printing system according to claim 13, said standard color gamut comprising CMYK.

15. The printing system according to claim 13, said another colorant comprising clear or white.

16. The printing system according to claim 13, further comprising:
a media path delivering a media substrate to said print engine; and
a return paper path delivering said media substrate to said print engine for at least one additional layer according to said print job description, subsequent layers being rendered on a same side of said media substrate.

17. The printing system according to claim 13, further comprising:
a user interface operatively connected to said processor, said user interface receiving user selectable instructions modifying printing instructions for user selected pages on said sheet, said user selectable instructions including parameters associated with said number of passes of said sheet through said print engine and said print job description for at least one of said standard color gamut and said another colorant for printing each page of said multiple pages on a media substrate;
said processor generating a modified ready-to-print file from said ready-to-print file using modified printing instructions for user selected pages of said multiple pages on said sheet; and
said marking device rendering said images on said media substrate according to said modified ready-to-print file.

18. The printing system according to claim 17, further comprising:
a computer storage medium, said processor saving said modified ready-to-print file in said computer storage medium.

19. The printing system according to claim 17, said marking device rendering said images on said media substrate according to said modified ready-to-print file further comprising:
sending said modified ready-to-print file to said print engine;
rendering a first layer on said media substrate according to said modified printing instructions; and
returning said media substrate to said print engine for at least one additional layer according to said modified printing instructions, subsequent layers being rendered on a same side of said media substrate.

* * * * *